United States Patent
Takeichi et al.

(10) Patent No.: US 9,254,420 B2
(45) Date of Patent: *Feb. 9, 2016

(54) GOLF BALL COMPOSITION AND GOLF BALL

(75) Inventors: Hideo Takeichi, Chichibushi (JP); Takashi Ohira, Chichibushi (JP); Yuichiro Ozawa, Chichibushi (JP); Tsuyoshi Nakajima, Chichibushi (JP); Satoru Tamaki, Kodaira (JP); Yusuke Yamagata, Kodaira (JP); Teppei Mori, Kodaira (JP)

(73) Assignees: BRIDGESTONE SPORTS CO., LTD., Tokyo (JP); BRIDGESTONE CORPORATION, Tokyo (JP)

( * ) Notice: Subject to any disclaimer, the term of this patent is extended or adjusted under 35 U.S.C. 154(b) by 453 days.

This patent is subject to a terminal disclaimer.

(21) Appl. No.: 13/419,871

(22) Filed: Mar. 14, 2012

(65) Prior Publication Data

US 2013/0150182 A1      Jun. 13, 2013

(30) Foreign Application Priority Data

Dec. 8, 2011   (JP) ................................ 2011-268950

(51) Int. Cl.
| | |
|---|---|
| C08L 9/00 | (2006.01) |
| A63B 37/00 | (2006.01) |
| A63B 37/04 | (2006.01) |
| C08F 136/06 | (2006.01) |
| C08F 4/54 | (2006.01) |
| C08F 4/6592 | (2006.01) |
| A63B 45/00 | (2006.01) |

(52) U.S. Cl.
CPC ......... *A63B 37/0003* (2013.01); *A63B 37/0051* (2013.01); *A63B 37/0076* (2013.01); *C08L 9/00* (2013.01); *A63B 37/008* (2013.01); *A63B 37/0033* (2013.01); *A63B 37/0064* (2013.01); *A63B 37/0065* (2013.01); *A63B 37/0066* (2013.01); *A63B 37/0074* (2013.01); *A63B 37/0075* (2013.01); *A63B 37/0081* (2013.01); *A63B 37/0084* (2013.01); *A63B 45/00* (2013.01); *C08F 4/545* (2013.01); *C08F 4/65922* (2013.01); *C08F 136/06* (2013.01)

(58) Field of Classification Search
None
See application file for complete search history.

(56) References Cited

U.S. PATENT DOCUMENTS

| | | | |
|---|---|---|---|
| 6,277,920 B1 | 8/2001 | Nesbitt | |
| 6,419,594 B1 * | 7/2002 | Nesbitt et al. | 473/371 |
| 6,521,726 B1 * | 2/2003 | Kimura et al. | 526/160 |
| 6,692,381 B2 | 2/2004 | Sakagami et al. | |
| 6,790,147 B2 | 9/2004 | Bissonnette et al. | |
| 7,041,006 B2 | 5/2006 | Bissonnette et al. | |
| 7,148,290 B2 | 12/2006 | Fujisawa et al. | |
| 7,196,031 B2 | 3/2007 | Kaita et al. | |
| 7,230,053 B2 | 6/2007 | Higuchi et al. | |
| 7,244,194 B2 | 7/2007 | Sullivan | |
| 7,799,725 B2 | 9/2010 | Suzuki et al. | |
| 2004/0018892 A1 * | 1/2004 | Nanba et al. | 473/371 |
| 2006/0094832 A1 * | 5/2006 | Sakagami et al. | 525/343 |
| 2009/0264604 A1 * | 10/2009 | Kaita et al. | 526/126 |
| 2012/0100936 A1 * | 4/2012 | Sullivan et al. | 473/371 |
| 2013/0150184 A1 * | 6/2013 | Takeichi et al. | 473/371 |
| 2013/0340909 A1 * | 12/2013 | Zhao | 152/525 |

FOREIGN PATENT DOCUMENTS

| | | |
|---|---|---|
| JP | 10-179804 A | 7/1998 |
| JP | 2000-31370 A | 11/2000 |
| JP | 2002-239034 A | 8/2002 |
| JP | 2002-282393 A | 10/2002 |
| JP | 2002-338737 A | 11/2002 |
| JP | 2003-154033 A | 5/2003 |
| JP | 2003-190333 A | 7/2003 |
| JP | 2003-225327 A | 8/2003 |
| JP | 2005-89551 A | 4/2005 |
| JP | 2005-111049 A | 4/2005 |
| JP | 2007-63240 A | 3/2007 |
| JP | 2007-222196 A | 9/2007 |
| JP | 2008-161345 A | 7/2008 |
| WO | 2006/049016 A1 | 5/2006 |

OTHER PUBLICATIONS

Smith; Characterization of Elution Chromatography Fractions From CIS-Polybutadiene by GPC; Rubber Chemistry and Technology 43(6); Dec. 1970;pp. 1439-1450.*

* cited by examiner

*Primary Examiner* — David Buttner
(74) *Attorney, Agent, or Firm* — Sughrue Mion, PLLC

(57) ABSTRACT

A golf ball having a good rebound and excellent flight performance can be obtained using a golf ball composition which includes a diene polymer containing not more than 1.5% of components having a molecular weight of 30,000 or less.

36 Claims, No Drawings

GOLF BALL COMPOSITION AND GOLF BALL

CROSS-REFERENCE TO RELATED APPLICATION

This non-provisional application claims priority under 35 U.S.C. §119(a) on Patent Application No. 2011-268950 filed in Japan on Dec. 8, 2011, the entire contents of which are hereby incorporated by reference.

BACKGROUND OF THE INVENTION

1. Field of the Invention

The present invention relates to a golf ball composition from which golf balls having an especially good rebound and an outstanding flight performance can be obtained. The invention also relates to a golf ball formed using such a composition.

2. Prior Art

In order to confer golf balls with an excellent rebound, various improvements have hitherto been carried out, not only on the ball construction, but also on the materials from which the ball is formed.

For example, in order to develop a polymeric material having high thermal properties (e.g., thermal stability) and mechanical properties (e.g., tensile modulus, flexural modulus), JP-A 2000-313710 discloses a catalyst composition which is capable of producing a conjugated diene polymer having a high cis-1,4 structure content in the microstructure and having a narrow molecular weight distribution. JP-A 2002-282393 and JP-A 2002-338737 describe solid golf balls having a good flight performance, in which balls a solid core has been formed using a polybutadiene rubber obtained with, for example, the catalyst composition described in JP-A 2000-313710.

Other prior art relating to the present invention is disclosed in, for example, JP-A 2002-239034, JP-A 2003-154033, JP-A 2003-190333, JP-A 2003-225327, JP-A 2005-089551, JP-A 2005-111049, JP-A 2007-222196, JP-A 2008-161345, U.S. Pat. No. 6,277,920, and U.S. Pat. No. 7,244,194. However, from the standpoint of the rebound and other properties of the golf ball, further improvements are desired in such prior art.

In view of the foregoing, it is an object of the present invention to provide a golf ball composition from which golf balls having a good rebound and an excellent flight performance can be obtained. A further object is to provide a golf ball formed using such a composition.

SUMMARY OF THE INVENTION

We have discovered that compositions containing a diene polymer in which the content of low-molecular weight component is small have a low energy loss and are thus advantageous for increasing the rebound of a golf ball.

Accordingly, the invention provides a golf ball composition which contains a diene polymer that includes not more than 1.5% of components having a molecular weight of 30,000 or less. In a preferred embodiment, the diene polymer includes not more than 0.7% of components having a molecular weight of 20,000 or less. In another preferred embodiment, the diene polymer includes not more than 0.2% of components having a molecular weight of 10,000 or less.

The diene polymer may have a cis-1,4 bond content of at least 90% and a 1,2-vinyl bond content of not more than 2.0%.

The diene polymer may have a molecular weight distribution (Mw/Mn) of not more than 3.

The invention also provides a golf ball having a solid core of one or more layer and, outside of the core, a cover of one or more layer, wherein the solid core is formed of the foregoing golf ball composition.

The golf ball composition of the invention enables golf balls having an especially good rebound and an excellent flight performance to be obtained.

DETAILED DESCRIPTION OF THE INVENTION

The objects, features and advantages of the invention will become more apparent from the following detailed description.

The golf ball composition of the invention contains (A) a diene polymer which includes not more than 1.5% of components having a molecular weight of 30,000 or less.

Illustrative examples of the diene polymer serving as component A include polymers which contain units from a conjugated diene compound such as 1,3-butadiene, isoprene, 1,3-pentadiene, 2,3-dimethyl-1,3-butadiene, 2-phenyl-1,3,butadiene and 1,3-hexadiene. In the practice of the invention, of the above, polymers containing units from 1,3-butadiene, isoprene and 2,3-dimethyl-1,3-butadiene are especially preferred. The conjugated diene compound may be used singly or two or more conjugated diene compounds may be used in combination. Examples of aromatic vinyl compounds which may be copolymerized with such conjugated diene compounds include styrene, α-methylstyrene, 1-vinylnaphthalene, 3-vinyltoluene, ethylvinylbenzene, divinylbenzene, 4-cyclohexylstyrene and 2,4,6-trimethylstyrene. These may be used singly or two or more may be used in combination.

The diene polymer includes not more than 1.5%, preferably not more than 0.8%, and more preferably not more than 0.4%, of components having a molecular weight of 30,000 or less. If this content is too high, the amount of low-molecular-weight components rises, increasing the number of molecular ends, which results in a larger energy loss and thus diminishes the initial velocity-enhancing effect. It is advantageous for the diene polymer to include preferably not more than 0.7%, more preferably not more than 0.4%, and even more preferably not more than 0.1%, of components having a molecular weight of 20,000 or less. Moreover, it is advantageous for the diene polymer to include preferably not more than 0.2%, more preferably not more than 0.1%, and even more preferably 0%, of components having a molecular weight of 10,000 or less.

Although not subject to any particular limitation, the smallest molecular weight value in the diene polymer is preferably at least 3,000, more preferably at least 10,000, and even more preferably at least 18,000.

The weight-average molecular weight (Mw) of component A, although not subject to any particular limitation, may be set to typically at least $20\times10^4$, and preferably at least $25\times10^4$. The upper limit in the weight-average molecular weight (Mw) of component A is typically not more than $150\times10^4$, and preferably not more than $120\times10^4$. If the weight-average molecular weight of component A is too low, a sufficient rebound may not be obtained. On the other hand, if the weight-average molecular weight is too high, the workability of the composition may decline considerably.

Component A has a molecular weight distribution, defined as the ratio Mw/Mn of the weight-average molecular weight (Mw) to the number-average molecular weight (Mn), which, although not subject to any particular limitation, may be set to not more than 3, preferably not more than 2.5, more preferably not more than 2, even more preferably not more than 1.9, and most preferably not more than 1.85. The molecular weight distribution (Mw/Mn), although not subject to any particular lower limit, is typically at least 1.0. If the molecular weight distribution of component A is too broad, a sufficient rebound may not be obtainable. One conceivable cause is that the crosslink density is not uniform under such circumstances.

In the invention, the molecular weight (M), weight-average molecular weight (Mw) and number-average molecular weight (Mn) refer to polystyrene-equivalent molecular weights measured using gel permeation chromatography (GPC).

The molecular weight (M) is calculated as follows. First, a standard mixed sample of known molecular weights (polystyrene) is measured, and a chart of retention times on the horizontal axis versus intensities of response by the recorder on the vertical axis is obtained. A calibration curve is then prepared from the peak-top elution times and molecular weights for the respective peaks in the chart. Next, by similarly carrying out measurement on a test sample, sample concentrations can be determined from the signal intensities at the respective elution positions and molecular weights (relative molecular weights) can be determined from the calibration curve.

Moreover, because there exists a correlation between the elution time and the molecular weight, the elution time for a component having a molecular weight (M) of 30,000 can be determined from the calibration curve. In this invention, components detected at or subsequent to this elution time on the chart are treated as components having molecular weights of 30,000 or less. Next, the surface areas of peaks at or subsequent to this elution time as a percentage of the total peak surface area of the test sample is calculated, and this percentage is treated as the content of components having a molecular weight of 30,000 or less. The content of components having a molecular weight of 20,000 or less and the content of components having a molecular weight of 10,000 or less can be similarly calculated. In the chart of the test sample, the molecular weight corresponding to the elution time at the end of the last peak detected (i.e., the point in time at which the intensity of response by the recorder becomes 0) is treated as the smallest molecular weight value. In this specification, the peaks measured by GPC refer to peaks from the polymer.

The cis-1,4 bond content in the diene polymer serving as component A, although not subject to any particular limitation, is typically at least 90%, preferably at least 93%, and more preferably at least 95%. The trans-1,4 bond content in component A, although not subject to any particular limitation, is typically not more than 7%, preferably not more than 5%, even more preferably not more than 4%, and still more preferably not more than 3.5%. At a cis-1,4 bond content or a trans-1,4 bond content outside of the above ranges, the ball rebound may decrease.

The 1,2-vinyl bond content in component A, although not subject to any particular limitation, is typically not more than 3%, preferably not more than 2.0%, and even more preferably not more than 1.5%. At a 1,2-vinyl bond content outside of this range, the ball rebound may decrease.

Here, in order to lower the content of components having a molecular weight of 30,000 or less, it is preferable for the diene polymer to be synthesized using as the catalyst at least one type of complex selected from the group consisting of metallocene complexes of general formulas (I) and (II) below, and half-metallocene cation complexes of general formula (III) below. Moreover, it is desirable for such synthesis to be carried out using a catalyst composition containing also other ingredients, such as a co-catalyst, which are commonly included in metallocene complex-containing polymerization catalyst compositions.

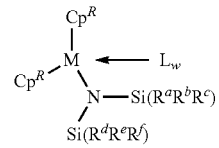
(I)

In formula (I), M is a lanthanide element, scandium or yttrium; each occurrence of $Cp^R$ is a substituted or unsubstituted indenyl; $R^a$ to $R^f$ are each independently an alkyl group of 1 to 3 carbons or a hydrogen atom; L is a neutral Lewis base; and w is an integer from 0 to 3.

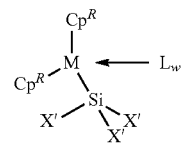
(II)

In formula (II), M is a lanthanide element, scandium or yttrium; each occurrence of $Cp^R$ is a substituted or unsubstituted indenyl; X' is a hydrogen atom, a halogen atom, an alkoxide group, a thiolate group, an amide group, a silyl group or a hydrocarbon group of 1 to 20 carbons; L is a neutral Lewis base; and w is an integer from 0 to 3.

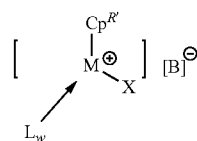
(III)

In formula (III), M is a lanthanide element, scandium or yttrium; $Cp^{R'}$ is a substituted or unsubstituted cyclopentadienyl, indenyl or fluorenyl; X is a hydrogen atom, a halogen atom, an alkoxide group, a thiolate group, an amide group, a silyl group or a hydrocarbon group of 1 to 20 carbons; L is a neutral Lewis base; w is an integer from 0 to 3; and $[B]^-$ is a non-coordinating anion.

In the metallocene complexes of above general formulas (I) and (II), $Cp^R$ is a substituted indenyl or an unsubstituted indenyl. $Cp^R$ moieties in which an indenyl ring serves as the basic skeleton may be represented as $C_9H_{7-x}R_x$ or $C_9H_{11-x}R_x$. Here, x is an integer from 0 to 7 or an integer from 0 to 11. Also, it is preferable for each occurrence of R to be independently a hydrocarbyl group or a metalloid group. The number of carbons on the hydrocarbyl group is preferably from 1 to 20, more preferably from 1 to 10, and even more preferably from 1 to 8. Preferred examples of the hydrocarbyl group include methyl, ethyl, phenyl and benzyl. The metalloid group (and the metalloid element therein) is exemplified by germyl (containing germanium), stannyl (containing tin) and silyl (containing silicon). It is preferable for the metalloid group to have thereon a hydrocarbyl group, in which case the hydrocarbyl group on the metalloid group is similar to the above-described hydrocarbyl group. An illustrative example of the metalloid group is trimethylsilyl. Illustrative examples of substituted indenyls include 2-phenylindenyl and 2-methylindenyl. The two $Cp^R$ moieties in general formulas (I) and (II) may be the same or different.

In the half metallocene cation complex of general formula (III) above, $Cp^{R'}$ in the formula is a substituted or unsubstituted cyclopentadienyl, indenyl or fluorenyl. Of these, a substituted or unsubstituted indenyl is preferred. $Cp^{R'}$ moieties in which a cyclopentadienyl ring serves as the basic skeleton are represented as $C_5H_{5-x}R_x$. Here, x is an integer from 0 to 5. It is preferable for each occurrence of R to be independently a hydrocarbyl group or a metalloid group. The number of carbons on the hydrocarbyl group is preferably from 1 to 20, more preferably from 1 to 10, and even more preferably from 1 to 8. Illustrative examples of the hydrocarbyl group include methyl, ethyl, phenyl and benzyl. The metalloid group (and the metalloid element therein) is exemplified by germyl (containing germanium), stannyl (containing tin) and silyl (containing silicon). It is preferable for the metalloid group to have thereon a hydrocarbyl group, in which case the hydrocarbyl group on the metalloid group is similar to the above-described hydrocarbyl group. An illustrative example of the metalloid group is trimethylsilyl. Illustrative examples of the $Cp^{R'}$ moiety in which a cyclopentadienyl ring serves as the basic skeleton are shown below.

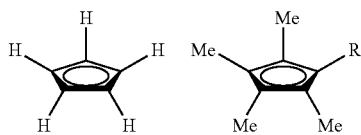

In the above formula, R is a hydrogen atom, methyl or ethyl.

In general formula (III), the $Cp^{R'}$ moiety in which an indenyl ring serves as the basic skeleton is defined in the same way as $Cp^R$ in general formula (I), and preferred examples thereof are also the same.

In general formula (III), the $Cp^{R'}$ moiety in which a fluorenyl ring serves as the basic skeleton may be represented as $C_{13}H_{9-x}R_x$ or $C_{13}H_{17-x}R_x$. Here, x is an integer from 0 to 9 or an integer from 0 to 17. Each occurrence of R is independently a hydrocarbyl group or a metalloid group. The number of carbons on the hydrocarbyl group is preferably from 1 to 20, more preferably from 1 to 10, and even more preferably from 1 to 8. Preferred examples of the hydrocarbyl group include methyl, ethyl, phenyl and benzyl. The metalloid group (and the metalloid element therein) is exemplified by germyl (containing germanium), stannyl (containing tin) and silyl (containing silicon). It is preferable for the metalloid group to have thereon a hydrocarbyl group, in which case the hydrocarbyl group on the metalloid group is similar to the above-described hydrocarbyl group. An illustrative example of the metalloid group is trimethylsilyl.

The center metal M in general formulas (I), (II) and (III) is a lanthanide element, scandium or yttrium. Lanthanide elements include the 15 elements having atomic numbers from 57 to 71, and may be any of these. Preferred examples of the center metal M include samarium Sm, neodymium Nd, praseodymium Pr, gadolinium Gd, cerium Ce, holmium Ho, scandium Sc and yttrium Y. In the practice of the invention, from the standpoint of obtaining a diene polymer having a relatively narrow molecular weight distribution and thereby conferring the golf ball with a good rebound, neodymium, samarium and gadolinium are more preferred. Gadolinium is especially recommended.

The metallocene complex of general formula (I) includes a silylamide ligand [—$N(SiR_3)_2$]. Each R group included on the silylamide ligand ($R^a$ to $R^f$ in general formula (I)) may be independently an alkyl group of 1 to 3 carbons or a hydrogen atom. It is preferable for at least one of $R^a$ to $R^f$ to be a hydrogen atom. By having at least one of $R^a$ to $R^f$ be a hydrogen atom, catalyst synthesis is easy and bulkiness around the silicon atom decreases, as a result of which an unconjugated olefin is more easily introduced. From a similar standpoint, it is preferable for at least one of $R^a$ to $R^c$ to be a hydrogen atom, and for at least one of $R^d$ to $R^f$ to be a hydrogen atom. The alkyl group is preferably methyl.

The metallocene complex of general formula (II) includes a silyl ligand [—$SiX'_3$]. The X' groups included on the silyl ligand [—$SiX'_3$] are groups defined in the same way as X in general formula (III) described below, and the preferred groups are also similar.

In general formula (III), X is a group selected from among hydrogen, halogen atoms, alkoxide groups, thiolate groups, amide groups, silyl groups, and hydrocarbon groups of 1 to 20 carbons. Here, examples of alkoxide groups include aliphatic alkoxy groups such as methoxy, ethoxy, propoxy, n-butoxy, isobutoxy, sec-butoxy and tert-butoxy; and aryloxy groups such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy and 2-isopropyl-6-neopentylphenoxy. Of these, a 2,6-di-tert-butylphenoxy group is preferred.

Thiolate groups represented by X in general formula (III) are exemplified by aliphatic thiolate groups such as thiomethoxy, thioethoxy, thiopropoxy, thio-n-butoxy, thio-isobutoxy, thio-sec-butoxy and thio-tert-butoxy; and aryl thiolate groups such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy and 2,4,6-triisopropylthiophenoxy. Of these, a 2,4,6-triisopropylthiophenoxy group is preferred.

Amide groups represented by X in general formula (III) are exemplified by aliphatic amide groups such as dimethylamido, diethylamido and diisopropylamido; aryl amide groups such as phenylamido, 2,6-di-tert-butylphenylamido, 2,6-diisopropylphenylamido, 2,6-dineopentylphenylamido, 2-tert-butyl-6-isopropylphenylamido, 2-tert-butyl-6-neopentylphenylamido, 2-isopropyl-6-neopentylphenylamido and 2,4,6-tert-butylphenylamido; and bistrialkylsilylamide groups such as bistrimethylsilylamido. Of these, a bistrimethylsilylamido group is preferred.

Silyl groups represented by X in general formula (III) are exemplified by trimethylsilyl, tris(trimethylsilyl)silyl, bis(trimethylsilyl)methylsilyl, trimethylsilyl(dimethyl)silyl and triisopropylsilyl(bistrimethylsilyl)silyl. Of these, tris(trimethylsilyl)silyl is preferred.

Halogen atoms represented by X in general formula (III) may be any from among fluorine, chlorine, bromine and iodine atoms. Of these, chlorine atoms and bromine atoms are preferred. Illustrative examples of hydrocarbon groups of 1 to 20 carbons represented by X include linear or branched aliphatic hydrocarbon groups such as methyl, ethyl, n-propyl, isopropyl, n-butyl, isobutyl, sec-butyl, tert-butyl, neopentyl, hexyl and octyl; aromatic hydrocarbon groups such as phenyl, tolyl and naphthyl; aralkyl groups such as benzyl; and silicon atom-containing hydrocarbon groups such as trimethylsilylmethyl and bistrimethylsilylmethyl. Of these, methyl, ethyl, isobutyl and trimethylsilylmethyl are preferred.

In general formula (III), X is preferably a bistrimethylsilylamide group or a hydrocarbon group of 1 to 20 carbons.

The non-coordinating anion indicated as [B]⁻ in general formula (III) is exemplified by a tetravalent boron anion. Illustrative examples of tetravalent boron anions include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate and tridecahydride-7,8-dicarbaundecaborate. Of these, tetrakis(pentafluorophenyl)borate is preferred.

The metallocene complexes represented by above general formulas (I) and (II) and the half-metallocene cation complex represented by above general formula (III) also include from 0 to 3, and preferably 0 or 1, neutral Lewis bases L. Here, the neutral Lewis bases L are exemplified by tetrahydrofuran, diethyl ether, dimethylaniline, trimethylphosphine, lithium chloride, neutral olefins and neutral diolefins. In cases where the complex includes a plurality of neutral Lewis bases L, the neutral Lewis bases L may be the same or different.

The metallocene complexes of general formulas (I) and (II) and the half-metallocene cation complex of general formula (III) may exist as a monomer or may instead exist as a dimer or higher multimer.

The metallocene complex of general formula (I) may be obtained by, for example, reacting a lanthanide trihalide, scandium trihalide or yttrium trihalide with an indenyl salt (such as a potassium salt or lithium salt) and a bis(trialkylsilyl)amide salt (such as a potassium salt or lithium salt) within a solvent. The reaction temperature may be set to about room temperature, enabling synthesis to be carried out under mild conditions. Moreover, the reaction time may be set to any suitable period, such as in a range of from several hours to several tens of hours. The reaction solvent is not subject to any particular limitation, although a solvent which dissolves the starting materials and the product is preferred. For example, toluene may be used. An example of a reaction for obtaining the metallocene complex of general formula (I) is shown below.

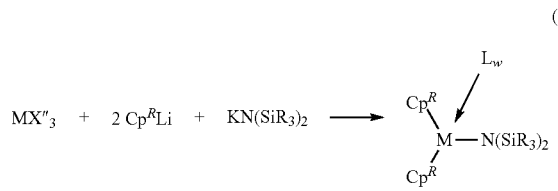

In the formula, X″ is a halide.

The metallocene complex of general formula (II) may be obtained by, for example, reacting a lanthanide trihalide, scandium trihalide or yttrium trihalide with an indenyl salt (such as a potassium salt or lithium salt) and a silyl salt (such as a potassium salt or lithium salt) within a solvent. The reaction temperature may be set to about room temperature, enabling synthesis to be carried out under mild conditions. Moreover, the reaction time may be set to any suitable period, such as in a range of from several hours to several tens of hours. The reaction solvent is not subject to any particular limitation, although a solvent which dissolves the starting materials and the product is preferred. For example, toluene may be used. An example of a reaction for obtaining the metallocene complex of general formula (II) is shown below.

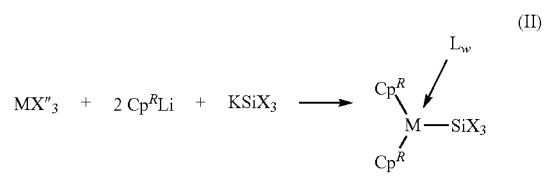

In the formula, X″ is a halide.

The half-metallocene cation complex of general formula (III) may be obtained by the following reaction.

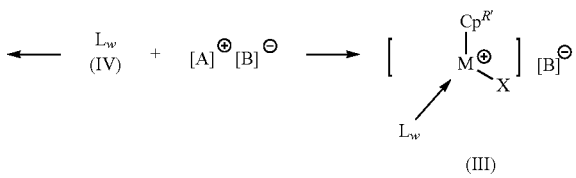

Here, in the compound represented by general formula (IV), M is a lanthanide element, scandium or yttrium; each occurrence of $Cp^{R'}$ is independently a substituted or unsubstituted cylopentadienyl, indenyl or fluorenyl; X is a hydrogen atom, a halogen atom, an alkoxide group, a thiolate group, an amide group, a silyl group or a hydrocarbon group of 1 to 20 carbons; L is a neutral Lewis base; and w is an integer from 0 to 3. In the ionic compound represented by general formula [A]⁺[B]⁻, [A]⁺ is a cation and [B]⁻ is a non-coordinating anion.

The cation represented by [A]⁺ is exemplified by carbonium cations, oxonium cations, amine cations, phosphonium cations, cycloheptatrienyl cations, and transition metal-bearing ferrocenium cations. Examples of carbonium cations include trisubstituted carbonium cations such as the triphenylcarbonium cation and tri(substituted phenyl)carbonium cations. An example of a tri(substituted phenyl)carbonyl cation is the tri(methylphenyl)carbonium cation. Examples of amine cations include trialkylammonium cations such as the trimethylammonium cation, triethylammonium cation, tripropylammonium cation and tributylammonium cation; N,N-dialkylanilinium cations such as the N,N-dimethylanilinium cation, N,N-diethylanilinium cation and N,N-2,4,6-pentamethylanilinium cation; and dialkylammonium cations such as the diisopropylammonium cation and dicyclohexylammonium cation. Examples of phosphonium cations include the triphenylphosphonium cation, tri(methylphenyl)phosphonium cation and tri(dimethylphenyl)phosphonium cation. Of these cations, an N,N-dialkylanilinium cation or a carbonium cation is preferred. An N,N-dialkylanilinium cation is especially preferred.

The ionic compound of general formula [A]⁺[B]⁻ used in the above reaction is a compound in which one of the above non-coordinating anions has been combined with one of the above cations. Preferred examples include N,N-dimethylanilinium tetrakis(pentafluorophenyl)borate and triphenylcarbonium tetrakis(pentafluorophenyl)borate. The ionic compound of the general formula $[A]^+[B]^-$ is added in an amount of preferably from about 0.1 to about 10 moles, and more preferably about 1 mole, per mole of the metallocene complex. When a half-metallocene cation complex of general formula (III) is used in the polymerization reaction, the half-metallocene cation complex of general formula (III) may be furnished directly in this form to the polymerization reaction system, or the compound of general formula (IV) and the ionic compound of general formula $[A]^+[B]^-$ used in the reaction may be furnished separately to the polymerization reaction system and the half-metallocene cation complex of general formula (III) may be formed within the reaction system. Alternatively, a half-metallocene cation complex of general formula (III) may be formed within the reaction system by using a metallocene complex of general formula (I) or (II) in combination with an ionic compound of general formula $[A]^+[B]^-$.

The structures of the metallocene complexes of general formulas (I) and (II) and of the half-metallocene cation complex of general formula (III) are preferably determined by x-ray structural analysis.

Co-catalysts which may be used in the polymerization catalyst composition may be freely selected from among ingredients which are used as co-catalysts in conventional metallocene complex-containing polymerization catalyst compositions. Preferred co-catalysts include aluminoxanes, organoaluminum compounds, and the above-mentioned ionic compounds. These co-catalysts may be used singly, or two or more may be used in combination.

The aluminoxane is preferably an alkyl aluminoxane, such as methyl aluminoxane (MAO) or a modified methyl aluminoxane. An example of a modified methyl aluminoxane is MMAO-3A (available from Tosoh Finechem Corporation). The aluminoxane content in the polymerization catalyst composition, expressed as the elemental ratio Al/M of the center metal M in the metallocene complex to the aluminum element Al in the aluminoxane, is set to preferably from about 10 to about 1,000, and more preferably about 100.

The above organoaluminum compound is preferably an organoaluminum compound of the general formula AlRR'R" (wherein R and R' are each independently a $C_{1-10}$ hydrocarbon group or a hydrogen atom, and R" is a $C_{1-10}$ hydrocarbon group). Exemplary organoaluminum compounds include trialkylaluminums, dialkylaluminums, dialkylaluminum chlorides, alkylaluminum dichlorides and dialkylaluminum hydrides. Of these, trialkylaluminums and dialkylaluminums are preferred. Preferred examples include triethylaluminum, triisobutylaluminum and diisobutylaluminum. The content of the organoaluminum compound in the polymerization catalyst composition is preferably from 1 to 500 moles per mole of the metallocene complex.

The reaction conditions when carrying out polymerization using the above catalyst composition may be suitably selected according to the type of monomer or the type of catalyst composition, and is not subject to any particular limitation. For example, the polymerization temperature may be set in a range of generally from −100 to +100° C., and preferably from −50 to +80° C. The polymerization time may be set to generally from about 1 minute to about 12 hours, and preferably from about 5 minutes to about 5 hours. When the polymerization reaction proceeds and the intended degree of polymerization has been attained, the reaction is stopped by adding a known shortstopper to the polymerization system, after which a conventional technique may be used to separate the polymer that has formed from the reaction system.

The diene polymer serving as component A may be a diene polymer wherein a plurality of molecular chains have been coupled together or the ends have been modified using a coupling agent or a polyvalent modifier, either during polymerization or after polymerization. The coupling agent/polyvalent modifier is exemplified by tin, silicon, phosphorus or nitrogen-containing compounds, epoxy group-containing compound, ester compounds and carboxylic acids. Illustrative examples include tin tetrachloride, silicon tetrachloride, phosphorus trichloride, dibutyltin dichloride, dioctyltin bisoctylmaleate (DOTBOM), polyisocyanate compounds, polymethyl methacrylate, maleic acid, and 3-glycidyloxypropyltrimethoxysilane. The coupling reaction at polymerization active sites by the coupling agent/polyvalent modifier is preferably carried out by a solution reaction. It doesn't matter whether the monomer used at the time of polymerization may be left in the solution or not. The application of the coupling reaction is not particularly limited, could be employed in either a batch-type polymerization or a continuous polymerization. In addition, the reaction temperature in the coupling reaction is not subject to any particular limitation, so long as the reaction proceeds. Thus, for example, the reaction temperature in the polymerization reaction may also be used without modification in the coupling reaction. The amount of coupling agent/polyvalent modifier used is not subject to any particular limitation, provided some or all of the plurality of molecular chains on the polymer having active ends are converted to dimers, trimers or higher multimers. By using such coupling agents and polyvalent modifiers and reacting them with the diene polymer, a plurality of molecular chains are coupled linearly or as branched stars, thereby improving the cold flow properties of the diene polymer itself, and in turn giving rise to, for example, an increased golf ball rebound.

Alternatively, the diene polymer serving as component A may be a diene polymer synthesized by reacting a monovalent modifier or the like and having functional groups at the ends of the molecule or on the molecular chain. These functional groups confer the golf ball composition with improved cold flow properties due to interactions between the functional groups, and also impart, for example, an increased golf ball rebound and durability and an increased processability due to reactions and other interactions with fillers and other ingredients included in the golf ball composition.

Other rubber ingredients may also be included in the golf ball composition of the invention, insofar as the objects of the invention are achievable. Examples of such other rubber ingredients include polybutadiene obtained using a group VIII metal compound catalyst, and also styrene-butadiene rubber, natural rubber, isoprene rubber and ethylene-propylene-diene rubber.

In addition, the golf ball composition of the invention may also optionally include various additives such as (B) an unsaturated carboxylic acid, (C) an inorganic filler, (D) an organic peroxide, (E) an antioxidant, and (F) an organosulfur compound. These additives are described in detail below.

Illustrative examples of the unsaturated carboxylic acid (B) include acrylic acid, methacrylic acid, maleic acid and fumaric acid. Acrylic acid and methacrylic acid are especially preferred. Metal salts of the unsaturated carboxylic acid include zinc salts and magnesium salts. Of these, preferred use may be made of zinc acrylate.

The amount of component B included, although not subject to any particular limitation, may be set to typically at least 10 parts by weight, preferably at least 13 parts by weight, more preferably at least 16 parts by weight, even more preferably at least 18 parts by weight, and most preferably at least 20 parts by weight, per 100 parts by weight of component A. The upper limit in the amount of component B may be set to typically not more than 60 parts by weight, preferably not more than 50 parts by weight, more preferably not more than 45 parts by weight, even more preferably not more than 40 parts by weight, and most preferably not more than 35 parts by weight. If too little component B is included, a sufficient hardness may not achieved. On the other hand, if too much is included, the composition may become too hard, possibly resulting in a poor durability to use.

Illustrative examples of the inorganic filler (C) include zinc oxide, barium sulfate and calcium carbonate. The amount of inorganic filler included, although not subject to any particular limitation may be set to at least 1 part by weight, preferably at least 5 parts by weight, more preferably at least 9 parts by weight, and even more preferably at least 13 parts by weight, per 100 parts by weight of component A. The upper limit in the amount of component C may be set to typically not more than 80 parts by weight, preferably not more than 65 parts by weight, more preferably not more than 50 parts by eight, and even more preferably not more than 40 parts by weight. At an amount of component C outside the above range, it may not be possible to obtain a proper ball weight and a suitable rebound.

Illustrative examples of the organic peroxide (D) include dicumyl peroxide, 1,1-di(t-butylperoxy)-3,3,5-trimethylcyclohexane and 1,1-di(t-butylperoxy)cyclohexane. Commercial products may be used as these organic peroxides. Illustrative examples include Percumyl D, Perhexa 3M and Perhexa C-40 (all available from NOF Corporation).

The organic peroxide may be used singly or may be used as a combination of two or more types. From the standpoint of rebound in particular, the combined use of two or more organic peroxides is preferred. Although not subject to any particular limitation, letting the organic peroxide having the shortest half-life at 155° C. be component D-1 and the organic peroxide having the longest half-life be component D-2, and letting the half-life of component D-1 be (D-1), and the half-life of component D-2 be (D-2)$_t$, it is desirable to combine two organic peroxides such that the half-life ratio (D-2)$_t$/(D-1)$_t$ is preferably at least 7, more preferably at least 8, even more preferably at least 9, and most preferably at least 10. Although not subject to any particular limit, the half-life ratio may be set to preferably not more than 20, more preferably not more than 18, even more preferably not more than 16, and most preferably not more than 14. At a half-life ratio outside of the above range, even when two or more organic peroxides are used, golf ball properties such as rebound, compression and durability may worsen.

Here, although not subject to any particular limitation, the half-life (D-1)$_t$ of component D-1 at 155° C. is typically at least 5 seconds, preferably at least 10 seconds, and more preferably at least 15 seconds. The upper limit is typically not more than 120 seconds, preferably not more than 90 seconds, and more preferably not more than 60 seconds. The half-life (D-2)$_t$ of component D-2 at 155° C., which also is not subject to any particular limitation, is typically at least 300 seconds, preferably at least 360 seconds, and more preferably at least 420 seconds. The upper limit is typically not more than 800 seconds, preferably not more than 700 seconds, and even more preferably not more than 600 seconds. In the practice of the invention, the organic peroxide serving as component D-1 is preferably 1,1-bis(t-butylperoxy)cyclohexane, and the organic peroxide serving as component D-2 is preferably dicumyl peroxide.

The combined amount of the above organic peroxides included, although not subject to any particular limitation, is typically at least 0.05 part by weight, preferably at least 0.1 part by weight, and more preferably at least 0.15 part by weight, per 100 parts by weight of component A. Although not subject to any particular upper limit, the combined amount of the organic peroxides is typically not more than 3 parts by weight, preferably not more than 2 parts by weight, more preferably not more than 1 part by weight, even more preferably not more than 0.8 part by weight, and most preferably not more than 0.6 part by weight, per 100 parts by weight of component A. If too little is included, the time required for crosslinking will increase, as a result of which the productivity may decrease markedly and the compression may also undergo a large decline. On the other hand, if too much is included, the rebound and durability may decrease.

When above components D-1 and D-2 are used in combination as the organic peroxide, the amount of component D-1 added, although not subject to any particular limitation, is typically at least 0.05 part by weight, preferably at least 0.08 part by weight, and more preferably at least 0.1 part by weight, per 100 parts by weight of component A. The upper limit is typically not more than 0.5 part by weight, preferably not more than 0.4 part by weight, and more preferably not more than 0.3 part by weight. The amount of component D-2 added, although likewise not subject to any particular limitation, is typically at least 0.05 part by weight, preferably at least 0.15 part by weight, and more preferably at least 0.2 part by weight, per 100 parts by weight of component A. The upper limit is typically not more than 0.7 part by weight, preferably not more than 0.6 part by weight, and more preferably not more than 0.5 part by weight.

The above composition may also include an antioxidant (E). A commercial product may be used as this antioxidant. For example, preferred use may be made of Nocrac NS-6, Nocrac NS-30 (both available from Ouchi Shinko Chemical Industry Co., Ltd.), and Yoshinox 425 (Yoshitomi Pharmaceutical Industries, Ltd.). The amount of component E included, although not subject to any particular limitation, may be set to typically at least 0.05 part by weight per 100 parts by weight of component A. The upper limit may be set to typically not more than 3 parts by weight, preferably not more than 2 parts by weight, more preferably not more than 1 part by weight, and even more preferably not more than 0.5 part by weight.

Exemplary organosulfur compounds (F) include thiophenols, thionaphthols, halogenated thiophenols, and metal salts thereof. Illustrative examples include pentachlorothiophenol, pentafluorothiophenol, pentabromothiophenol, p-chlorothiophenol, and zinc salts thereof; diphenylpolysulfides, dibenzylpolysulfides, dibenzoylpolysulfides, dibenzothiazoylpolysulfides and dithiobenzoylpolysulfides having 2 to 4 sulfurs; alkylphenyldisulfides; and furan ring-bearing sulfur compounds and thiophene ring-bearing sulfur compounds. In the practice of the invention, the use of diphenyldisulfide or the zinc salt of pentachlorothiophenol is especially preferred.

The amount of component F included, although not subject to any particular limitation, is typically at least 0.05 part by weight, preferably at least 0.2 part by weight, more preferably at least 0.4 part by weight, even more preferably at least 0.7 part by weight, and most preferably at least 0.9 part by weight, per 100 parts by weight of component A. The upper limit in the amount included is typically not more than 5 parts by weight, preferably not more than 4 parts by weight, more preferably not more than 3 parts by weight, even more preferably not more than 2 parts by weight, and most preferably not more than 1.5 parts by weight, per 100 parts by weight of component A. If too little component F is included, a sufficient rebound may not be achieved. On the other hand, including too much may excessively lower the hardness, which may also prevent a sufficient rebound from being achieved.

The golf ball of the invention may take any of various forms according to the intended purpose thereof without particular limitation, provided the above-described golf ball composition is used in at least some portion of an integral part of the ball. Illustrative examples include one-piece golf balls formed entirely of the above composition; two-piece solid golf balls having a solid core and one cover layer, wherein at least some portion of the solid core and/or the cover is formed of the above composition; multi-piece solid golf balls composed of three or more pieces, which balls have a solid core of one or more layer and a cover of one or more layer, wherein at least some portion of the solid core and/or the cover is formed of the above composition; and wound golf balls wherein at least some portion of the solid center and/or the cover is formed of the above composition. Of these various forms, particularly in order to take full advantage of the properties of the composition and more effectively achieve a good golf ball rebound, a two-piece solid golf ball or multi-piece solid golf ball having a solid core formed of the above composition is preferred.

Examples of materials which may be used in portions of the golf ball other than the portion where the inventive golf ball composition is used include thermoplastic or thermoset polyurethane elastomers, polyester elastomers, ionomer resins, polyolefin elastomers and polyureas. One such material may be used alone or two or more may be used in admixture. The use of a thermoplastic polyurethane elastomer or an ionomer resin is especially preferred. The molding process employed may be a known process such as injection molding or compression molding.

A commercial product may be used as the thermoplastic polyurethane elastomer. Illustrative examples include Pandex T7298, Pandex T7295, Pandex T7890, Pandex TR3080, Pandex T8295, Pandex T8290 and Pandex T8260 (available from DIC Bayer Polymer, Ltd.). A commercial product may be used as the ionomer resin as well. Illustrative examples include Surlyn 6320, Surlyn 8120 and Surlyn 9945 (available from E.I. DuPont de Nemours & Co.), and Himilan 1706, Himilan 1605, Himilan 1855, Himilan 1601 and Himilan 1557 (available from DuPont-Mitsui Polychemicals Co., Ltd.).

Polymers such as thermoplastic elastomers other than those mentioned above may be included as optional ingredients in the above material. Examples of such other polymers include polyamide elastomers, styrene block elastomers, hydrogenated polybutadienes and ethylene-vinyl acetate (EVA) copolymers.

In cases where the golf ball of the invention is a one-piece golf ball or a golf ball having a solid core or a solid center, the deflection of the one-piece golf ball or the solid core or solid center, when compressed under a final load of 1,275 N (130 kgf) from an initial load state of 98 N (10 kgf), although not subject to any particular limitation, is typically at least 2.0 mm, and preferably at least 2.5 mm. The upper limit is typically not more than 6.0 mm, and preferably not more than 5.8 mm. If the deflection is too small, the feel on impact may worsen and, particularly on a long shot such as with a driver that causes a large deformation of the ball, the spin rate may rise excessively, resulting in a poor distance. On the other hand, if the one-piece golf ball or the solid core or solid center is too soft, the ball may have a deadened feel on impact and the rebound may be inadequate, possibly resulting in a poor distance, or the durability of the ball to cracking on repeated impact may worsen.

The diameter of the solid core, although not subject to any particular limitation, may be set to generally at least 20 mm, and preferably at least 30 mm. The upper limit may be set to generally not more than 42.5 mm, and preferably not more than 42.3 mm.

The specific gravity of the solid core, although not subject to any particular limitation, may be set to generally at least 0.7, and preferably at least 0.9. The upper limit may be set to generally not more than 1.6, and preferably not more than 1.4.

The thickness per cover layer formed of the inventive golf ball composition and the above-mentioned materials, although not subject to any particular limitation, may be set to generally at least 0.1 mm, and preferably at least 0.2 mm. The upper limit may be set to generally not more than 4 mm, and preferably not more than 3 mm.

In cases where the rubber composition of the invention is used to produce one-piece golf balls, two-piece solid golf balls and multi-piece solid golf balls, production may be carried out by effecting vulcanization and curing in the same way as with conventional rubber compositions for golf balls. The vulcanization conditions are exemplified by a vulcanization temperature of from 100 to 200° C. and a vulcanization time of from 10 to 40 minutes.

The diameter of the inventive golf ball may be set to not less than 42 mm, and in particular, according to the Rules of Golf for competitive play, preferably not less than 42.67 mm. The upper limit may be set to not more than 45 mm, and preferably not more than 44 mm. The weight may be set to not more than 48 g, and in particular, according to the Rules of Golf for competitive play, preferably not more than 45.93 g. The lower limit may be set to not less than 40 g, and preferably not less than 44 g.

EXAMPLES

Examples according to the invention and Comparative Examples are given below by way of illustration, and not by way of limitation.

Example 1

A catalyst solution was prepared by charging a 1-liter pressure-resistant glass reactor within a glove box under a nitrogen atmosphere with 6.0 μmol of bis(2-phenylindenyl) gadolinium bis(dimethylsilylamide) [(2-PhC$_9$H$_6$)$_2$GdN(Si-HMe$_2$)$_2$], 6.0 μmol of triphenylcarbonium tetrakis(pentafluorophenyl)borate (Ph$_3$CB(C$_6$F$_5$)$_4$) and 0.5 mmol of diisobutylaluminum, then dissolving these ingredients in 5.0 g of toluene and carrying out 30 minutes of aging. The reactor was subsequently removed from the glove box, 467 g of a toluene solution containing 15 wt % of 1,3-butadiene was added, and polymerization was carried out at 80° C. for 1 hour. Following polymerization, the reaction was stopped by adding 1 mL of an isopropanol solution containing 5 wt % of 2,2'-methylenebis(4-ethyl-6-t-butylphenol) (available from Ouchi Shinko Chemical Industry Co., Ltd. under the trade name "Nocrac NS-5"). The polymer was separated off using a large amount of methanol, then vacuum-dried at 70° C., thereby giving diene polymer A. The yield of the resulting diene polymer A was 65.1 g.

Example 2

A catalyst solution was prepared by charging a 1-liter pressure-resistant glass reactor within a glove box under a nitrogen atmosphere with 15.4 µmol of bis(2-phenylindenyl)gadolinium bis(dimethylsilylamide) [(2-PhC$_9$H$_6$)$_2$GdN(SiHMe$_2$)$_2$], 15.4 µmol of triphenylcarbonium tetrakis(pentafluorophenyl)borate (Ph$_3$CB(C$_6$F$_5$)$_4$) and 1.5 mmol of diisobutylaluminum, then dissolving these ingredients in 5.0 g of toluene and carrying out 30 minutes of aging. The reactor was subsequently removed from the glove box, 467 g of a toluene solution containing 15 wt % of 1,3-butadiene was added, and polymerization was carried out at 50° C. for 1 hour. Following polymerization, the reaction was stopped by adding 1 mL of an isopropanol solution containing 5 wt % of 2,2'-methylenebis(4-ethyl-6-t-butylphenol) (available from Ouchi Shinko Chemical Industry Co., Ltd. under the trade name "Nocrac NS-5"). The polymer was separated off using a large amount of methanol, then vacuum-dried at 70° C., thereby giving diene polymer B. The yield of the resulting diene polymer B was 65.9 g.

Example 3

A catalyst solution was prepared by charging a 1-liter pressure-resistant glass reactor within a glove box under a nitrogen atmosphere with 6.0 µmol of bis(2-phenylindenyl)gadolinium bis(dimethylsilylamide) [(2-PhC$_9$H$_6$)$_2$GdN(SiHMe$_2$)$_2$], 6.0 µmol of triphenylcarbonium tetrakis(pentafluorophenyl)borate (Ph$_3$CB(C$_6$F$_5$)$_4$) and 0.6 mmol of diisobutylaluminum, then dissolving these ingredients in 5.0 g of toluene and carrying out 30 minutes of aging. The reactor was subsequently removed from the glove box, 400 g of a toluene solution containing 15 wt % of 1,3-butadiene was added, and polymerization was carried out at 50° C. for 1 hour. Following polymerization, the reaction was stopped by adding 1 mL of an isopropanol solution containing 5 wt % of 2,2'-methylenebis(4-ethyl-6-t-butylphenol) (available from Ouchi Shinko Chemical Industry Co., Ltd. under the trade name "Nocrac NS-5"). The polymer was then separated off with a large amount of methanol, then vacuum-dried at 70° C., thereby giving diene polymer C. The yield of the resulting diene polymer C was 57.8 g.

Example 4

A catalyst solution was prepared by charging a 1-liter pressure-resistant glass reactor within a glove box under a nitrogen atmosphere with 4.8 µmol of bis(2-phenylindenyl)gadolinium bis(dimethylsilylamide) [(2-PhC$_9$H$_6$)$_2$GdN(SiHMe$_2$)$_2$], 4.8 µmol of triphenylcarbonium tetrakis(pentafluorophenyl)borate (Ph$_3$CB(C$_6$F$_5$)$_4$) and 0.5 mmol of diisobutylaluminum, then dissolving these ingredients in 5.0 g of toluene and carrying out 30 minutes of aging. The reactor was subsequently removed from the glove box, 400 g of a toluene solution containing 15 wt % of 1,3-butadiene was added, and polymerization was carried out at 50° C. for 1 hour. Following polymerization, the reaction was stopped by adding 1 mL of an isopropanol solution containing 5 wt % of 2,2'-methylenebis(4-ethyl-6-t-butylphenol) (available from Ouchi Shinko Chemical Industry Co., Ltd. under the trade name "Nocrac NS-5"). The polymer was separated off using a large amount of methanol, then vacuum-dried at 70° C., thereby giving diene polymer D. The yield of the resulting diene polymer D was 57.7 g.

Comparative Example 1

The polybutadiene rubber available under the trade name "BR730" from JSR Corporation, was used as a comparative example with respect to above diene polymers A to D.

The properties of the polymers in Examples 1 to 4 and Comparative Example 1 are shown in Table 1.

TABLE 1

| | Example | | | | Comparative |
| --- | --- | --- | --- | --- | --- |
| Type | 1 diene polymer A | 2 diene polymer B | 3 diene polymer C | 4 diene polymer D | Example 1 BR730 |
| Mw (×10$^4$) | 21.2 | 46.4 | 75.4 | 108.5 | 44.2 |
| Mn (×10$^4$) | 13.4 | 20.5 | 44.7 | 59.3 | 16.1 |
| Mw/Mn | 1.58 | 2.30 | 1.69 | 1.83 | 2.31 |
| cis-1,4 Bond content (%) | 95.0 | 98.7 | 97.0 | 97.0 | 97.0 |
| trans-1,4 Bond content (%) | 3.5 | 0.9 | 1.9 | 1.7 | 2.4 |
| 1,2-Vinyl bond content (%) | 1.5 | 0.4 | 1.2 | 1.3 | 0.6 |
| Content of components with molecular weight ≤30,000 (%) | 1.45 | 0.80 | 0.13 | 0.07 | 1.85 |
| Content of components with molecular weight ≤20,000 (%) | 0.63 | 0.36 | 0.03 | 0.02 | 0.88 |
| Content of components with molecular weight ≤10,000 (%) | 0.12 | 0.08 | 0.00 | 0.00 | 0.23 |
| Smallest molecular weight | 7,348 | 3,529 | 19,776 | 20,829 | 2,542 |

Details on various items in Table 1 are given below.
BR730: A polybutadiene produced by JSR Corporation
cis-1,4-Bond content (%):
  Proportion of cis-1,4 bonds in the diene polymer
trans-1,4-Bond content (%):
  Proportion of trans-1,4 bonds in the diene polymer
1,2-Vinyl bond content (%):
  Proportion of 1,2-vinyl bonds in the diene polymer The microstructures (cis-1,4 bond contents, trans-1,4 bond contents and 1,2-vinyl bond contents), molecular weights (M), weight-average molecular weights (Mw) and molecular weight distributions (Mw/Mn) of the polymers in Examples 1 to 4 and Comparative Example 1 were measured by the following methods.

(1) Microstructures

The FT-IR transmission spectrum of a carbon disulfide solution of the butadiene polymer prepared to a concentration of 5 mg/mL was measured against carbon disulfide alone in the same cell as a blank. Using the values e, f and g derived from the following determinant $$\begin{bmatrix} 1.7455 & 0 & -0.0151 \\ -0.0454 & 0.4292 & -0.0129 \\ -0.007 & 0 & 0.3746 \end{bmatrix} \begin{bmatrix} \log_{10}(a/d) \\ \log_{10}(a/b) \\ \log_{10}(a/c) \end{bmatrix} = \begin{bmatrix} e \\ f \\ g \end{bmatrix},$$

wherein a is the positive peak value near 1130 cm$^{-1}$ in the spectrum, b is the negative peak value near 967 cm$^{-1}$, c is the negative peak value near 911 cm$^{-1}$ and d is the negative peak value near 736 cm$^{-1}$, the cis-1,4 bond content, trans-1,4 bond content and 1,2-vinyl bond content were determined from the following formulas (i), (ii) and (iii):

cis-1,4 bond content (%)=$e/(e+f+g)\times 100$  (i)

trans-1,4 bond content (%)=$f/(e+f+g)\times 100$  (ii)

1,2-vinyl bond content (%)=$g/(e+f+g)\times 100$  (iii).

The positive peak value a near 1130 cm$^{-1}$ in the above spectrum indicates the baseline, the negative peak value b near 967 cm$^{-1}$ indicates the trans-1,4 bonds, the negative peak value c near 911 cm$^{-1}$ indicates the 1,2-vinyl bonds, and the negative peak value d near 736 cm$^{-1}$ indicates the cis-1,4 bonds. The microstructure contents in Table 1 are values rounded off to the nearest tenth.

(2) Molecular Weight (M), Weight-Average Molecular Weight (Mw), and Molecular Weight Distribution (Mw/Mn)

Measurement was carried out by gel permeation chromatography (GPC) (with an HLC-8020 system from Tosoh Corp.) and using a refractometer as the detector. The molecular weight was indicated as the polystyrene equivalent, with monodispersed polystyrene serving as the standard. A GMHXL column (Tosoh Corp.) was used, and the eluant was tetrahydrofuran.

The content of components having a molecular weight (M) of 30,000 or less was calculated as follows. First, a standard mixed sample of known molecular weights (polystyrene) was measured in accordance with the above-described method, and a chart of retention times on the horizontal axis versus intensities of response by the recorder on the vertical axis was obtained. A calibration curve was then prepared from the peak-top elution times and molecular weights for the respective peaks in the chart. Next, by similarly carrying out measurement on a test sample, sample concentrations were determined from the signal intensities at the respective elution positions and molecular weights (polystyrene-equivalent) were determined from the calibration curve.

Moreover, because there exists a correlation between the elution time and the molecular weight, the elution time for a component having a molecular weight (M) of 30,000 was determined from the calibration curve, and the components detected at or subsequent to this elution time on the chart were treated as components having molecular weights of 30,000 or less. Next, the surface area of peaks at or subsequent to this elution time as a percentage of the total peak surface area of the test sample was calculated, and this percentage was treated as the content of components having a molecular weight of 30,000 or less. The content of components having a molecular weight of 20,000 or less and the content of components having a molecular weight of 10,000 or less were similarly calculated. In this specification, the peaks measured by GPC refer to peaks from the polymer.

Using the polymers obtained as described above, compositions formulated as shown in Table 2 were prepared, following which the compositions were molded and vulcanized at 160° C. for 15 minutes, thereby fabricating solid cores having a diameter of 38.5 mm and a weight of 35.6 g. The initial velocities (rebounds) of the solid cores thus fabricated were evaluated by the subsequently described method. The results are shown in Table 2.

TABLE 2

|   |   | Example | | | | Comparative Example |
|---|---|---|---|---|---|---|
|   |   | 1 | 2 | 3 | 4 | 1 |
| Formulation (pbw) | Polymer A | 100 | | | | |
|   | Polymer B | | 100 | | | |
|   | Polymer C | | | 100 | | |
|   | Polymer D | | | | 100 | |
|   | BR730 | | | | | 100 |
|   | Zinc oxide | 22 | 22 | 22 | 22 | 22 |
|   | Antioxidant | 0.1 | 0.1 | 0.1 | 0.1 | 0.1 |
|   | Zinc acrylate | 30 | 30 | 30 | 30 | 30 |
|   | Percumyl D | 0.3 | 0.3 | 0.3 | 0.3 | 0.3 |
|   | Perhexa C-40 | 0.3 | 0.3 | 0.3 | 0.3 | 0.3 |
| Performance evaluation | Initial velocity difference (m/s) | +0.10 | +0.19 | +0.40 | +0.45 | — |

Details on some of the ingredients in Table 2 are given below.

Zinc oxide: Grade 3 zinc oxide, available from Sakai Chemical Co., Ltd.

Antioxidant: 2,2'-Methylenebis(4-methyl-6-t-butylphenol), available from Ouchi Shinko Chemical Industry Co., Ltd., under the trade name "Nocrac NS-6"

Zinc acrylate: Available from Nippon Shokubai Co., Ltd.

Percumyl D: Dicumyl peroxide, available from NOF Corporation

Perhexa C-40: 40% Dilution of 1,1-di(t-butylperoxy)-cyclohexane, available from NOF Corporation Initial Velocity of Solid Core (m/s)

The initial velocity of the solid core was measured using an initial velocity measuring apparatus of the same type as the USGA drum rotation-type initial velocity instrument approved by the R&A. The core was held isothermally at a temperature of 23±1° C. for at least 3 hours, then tested in a room temperature (23±2° C.) chamber.

Table 2 shows the difference of the measured value obtained in each example of the invention relative to a reference value of "0" for Comparative Example 1.

Japanese Patent Application No. 2011-268950 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a golf ball composition comprising:
   a step of producing a diene polymer (A) including not more than 1.5% of components having a molecular weight of 30,000 or less; which is synthesized using as a catalyst at least one type of complex selected from the group consisting of metallocene complexes of general formulae (I) and (II) below, and half-metallocene cation complexes of general formula (III) below, and using an organoaluminum compound of the general formula AlRR'R" wherein R and R' are each independently a $C_{1-10}$ hydrocarbon group, a chlorine or a hydrogen atom, and R" is a $C_{1-10}$ hydrocarbon group in an amount of from 83.3 to 500 moles per mole of the metallocene complex as a co-catalyst; wherein the center metal M in general formulae (I), (II) and (III) is gadolinium:

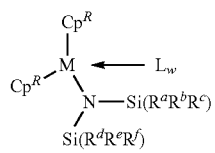
(I)

wherein in formula (I), each occurrence of $Cp^R$ is a substituted or unsubstituted indenyl; $R^a$ to $R^f$ are each independently an alkyl group of 1 to 3 carbons or a hydrogen atom; L is a neutral Lewis base; and w is an integer from 0 to 3;

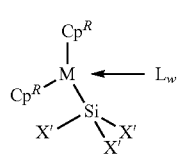
(II)

wherein in formula (II), each occurrence of $Cp^R$ is a substituted or unsubstituted indenyl; X' is a hydrogen atom, a halogen atom, an alkoxide group, a thiolate group, an amide group, a silyl group or a hydrocarbon group of 1 to 20 carbons; L is a neutral Lewis base; and w is an integer from 0 to 3;

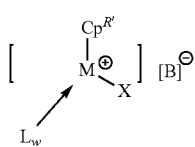
(III)

wherein in formula (III), $Cp^{R'}$ is a substituted or unsubstituted cyclopentadienyl, indenyl or fluorenyl; X is a hydrogen atom, a halogen atom, an alkoxide group, a thiolate group, an amide group, a silyl group or a hydrocarbon group of 1 to 20 carbons; L is a neutral Lewis base; w is an integer from 0 to 3; and [B]⁻ is a non-coordinating anion; and then a step of compounding the diene polymer (A) with an unsaturated carboxylic acid and/or a metal salt thereof (B), and an organic peroxide (D) to make up the golf ball composition.

2. The method for preparing a golf ball composition of claim 1, wherein the organoaluminum compound is selected from the group consisting of trialkylaluminum, dialkylaluminum, dialkylaluminum chloride, alkylaluminum dichloride and dialkylaluminum hydride.

3. The method for preparing a golf ball composition of claim 1, wherein the diene polymer (A) includes not more than 0.7% of components having a molecular weight of 20,000 or less.

4. The method for preparing a golf ball composition of claim 1, wherein the diene polymer (A) includes not more than 0.2% of components having a molecular weight of 10,000 or less.

5. The method for preparing a golf ball composition of claim 1, wherein the diene polymer (A) has a cis-1,4 bond content of at least 90% and a 1,2-vinyl bond content of not more than 2.0%.

6. The method for preparing a golf ball composition of claim 1, wherein the diene polymer (A) has a molecular weight distribution (Mw/Mn) of not more than 3.

7. A method for preparing a golf ball comprising a solid core of one or more layer and, outside of the core, a cover of one or more layer, wherein the solid core is formed by the method for preparing a golf ball composition of claim 1.

8. The method for preparing a golf ball composition of claim 1, wherein the diene polymer (A) has a weight-average molecular weight (Mw) of at least $20 \times 10^4$ and not more than $150 \times 10^4$.

9. The method for preparing a golf ball composition of claim 1, further comprising an unsaturated carboxylic acid and/or a metal salt thereof (B) in an amount of at least 10 parts by weight and not more than 60 parts by weight, per 100 parts by weight of diene polymer (A).

10. The method for preparing a golf ball composition of claim 1, further comprising an inorganic filler (C) in an amount of at least 1 part by weight and not more than 80 parts by weight, per 100 parts by weight of diene polymer (A).

11. The method for preparing a golf ball composition of claim 1, further comprising an organic peroxide (D) in an amount of least 0.05 parts by weight and not more than 3 parts by weight, per 100 parts by weight of diene polymer (A).

12. The method for preparing a golf ball composition of claim 1, further comprising an antioxidant (E) in an amount of at least 0.05 parts by weight and not more than 3 parts by weight, per 100 parts by weight of diene polymer (A).

13. The method for preparing a golf ball composition of claim 1, further comprising an organosulfur compound (F) in an amount of at least 0.05 parts by weight and not more than 5 parts by weight, per 100 parts by weight of diene polymer (A).

14. The method for preparing a golf ball composition of claim 1, wherein the diene polymer (A) includes at least 0.07% of components having a molecular weight of 30,000 or less.

15. The method for preparing a golf ball composition of claim 1, wherein the organic peroxide (D) comprises two or more organic peroxides having half-lives at 155° C., wherein the organic peroxide having the shortest half-life at 155° C. is component D-1 and the organic peroxide having the longest half-life at 155° C. is component D-2, and wherein the half-life of component D-1 is represented by $(D-1)_t$ and the half-life of component D-2 is represented by $(D-2)_t$, wherein the half-life ratio $(D-2)_t/(D-1)_t$ is at least 7.

16. The method for preparing a golf ball composition of claim 1, wherein the organic peroxide (D) is a combination of two organic peroxides selected from the group consisting of dicumyl peroxide, 1,1-di(t-butylperoxy)-3,3,5-trimethylcyclohexane and 1,1-di(t-butylperoxy)cyclohexane.

17. The method for preparing a golf ball composition of claim 1, wherein the diene polymer (A) is a diene polymer of which the ends have been modified using a polyvalent modifier, either during polymerization or after polymerization.

18. The method for preparing a golf ball composition of claim 1, wherein the diene polymer (A) is a diene polymer which is synthesized by reacting a monovalent modifier and which has functional groups at the ends of the molecule or on the molecular chain.

19. A method for preparing a golf ball composition comprising:

a step of producing a diene polymer (A) including not more than 1.5% of components having a molecular weight of 30,000 or less; which is synthesized using as a catalyst at least one type of complex selected from the group consisting of metallocene complexes of general formulae (I) and (II) below, and half-metallocene cation complexes of general formula (III) below, and using an organolaluminum compound of the general formula AlRR'R" wherein R and R' are each independently a $C_{1-10}$ hydrocarbon group, a chlorine or a hydrogen atom, and R" is a $C_{1-10}$ hydrocarbon group in an amount of from 83.3 to 500 moles per mole of the metallocene complex as a co-catalyst; wherein the center metal M in general formulae (I), (II) and (III) is gadolinium:

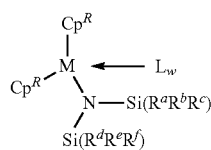

(I)

wherein in formula (I), each occurrence of $Cp^R$ is a substituted or unsubstituted indenyl; $R^a$ to $R^f$ are each independently an alkyl group of 1 to 3 carbons or a hydrogen atom; L is a neutral Lewis base; and w is an integer from 0 to 3;

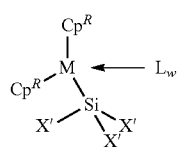

(II)

wherein in formula (II), each occurrence of $Cp^R$ is a substituted or unsubstituted indenyl; X' is a hydrogen atom, a halogen atom, an alkoxide group, a thiolate group, an amide group, a silyl group or a hydrocarbon group of 1 to 20 carbons; L is a neutral Lewis base; and w is an integer from 0 to 3;

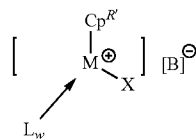

(III)

wherein in formula (III), $Cp^{R'}$ is a substituted or unsubstituted cyclopentadienyl, indenyl or fluorenyl; X is a hydrogen atom, a halogen atom, an alkoxide group, a thiolate group, an amide group, a silyl group or a hydrocarbon group of 1 to 20 carbons; L is a neutral Lewis base; w is an integer from 0 to 3; and [B]$^-$ is a non-coordinating anion; and then a step of compounding the diene polymer (A) with an unsaturated carboxylic acid and/or a metal salt thereof (B), and an organic peroxide (D) to make up the golf ball composition, and a step of stopping a reaction in the step of producing a diene polymer by adding a shortstopper to a polymerization system therein, after which the diene polymer is separated off using only methanol, thereby giving diene polymer.

20. The method for preparing a golf ball composition of claim 19, wherein the organoaluminum compound is selected from the group consisting of trialkylaluminum, dialkylaluminum, dialkylaluminum chloride, alkylaluminum dichloride and dialkylaluminum hydride.

21. The method for preparing a golf ball composition of claim 19, wherein the diene polymer (A) includes not more than 0.7% of components having a molecular weight of 20,000 or less.

22. The method for preparing a golf ball composition of claim 19, wherein the diene polymer (A) includes not more than 0.2% of components having a molecular weight of 10,000 or less.

23. The method for preparing a golf ball composition of claim 19, wherein the diene polymer (A) has a cis-1,4 bond content of at least 90% and a 1,2-vinyl bond content of not more than 2.0%.

24. The method for preparing a golf ball composition of claim 19, wherein the diene polymer (A) has a molecular weight distribution (Mw/Mn) of not more than 3.

25. A method for preparing a golf ball comprising a solid core of one or more layer and, outside of the core, a cover of one or more layer, wherein the solid core is formed by the method for preparing a golf ball composition of claim 19.

26. The method for preparing a golf ball composition of claim 19, wherein the diene polymer (A) has a weight-average molecular weight (Mw) of at least 20×10$^4$ and not more than 150×10$^4$.

27. The method for preparing a golf ball composition of claim 19, further comprising an unsaturated carboxylic acid and/or a metal salt thereof (B) in an amount of at least 10 parts by weight and not more than 60 parts by weight, per 100 parts by weight of diene polymer (A).

28. The method for preparing a golf ball composition of claim 19, further comprising an inorganic filler (C) in an amount of at least 1 part by weight and not more than 80 parts by weight, per 100 parts by weight of diene polymer (A).

29. The method for preparing a golf ball composition of claim 19, further comprising an organic peroxide (D) in an amount of at least 0.05 parts by weight and not more than 3 parts by weight, per 100 parts by weight of diene polymer (A).

30. The method for preparing a golf ball composition of claim 19, further comprising an antioxidant (E) in an amount of at least 0.05 parts by weight and not more than 3 parts by weight, per 100 parts by weight of diene polymer (A).

31. The method for preparing a golf ball composition of claim 19, further comprising an organosulfur compound (F) in an amount of at least 0.05 parts by weight and not more than 5 parts by weight, per 100 parts by weight of diene polymer (A).

32. The method for preparing a golf ball composition of claim 19, wherein the diene polymer (A) includes at least 0.07% of components having a molecular weight of 30,000 or less.

33. The method for preparing a golf ball composition of claim 19, wherein the organic peroxide (D) comprises two or more organic peroxides having half-lives at 155° C., wherein the organic peroxide having the shortest half-life at 155° C. is component D-1 and the organic peroxide having the longest half-life at 155° C. is component D-2, and wherein the half-life of component D-1 is represented by $(D-1)_t$ and the half-life of component D-2 is represented by $(D-2)_t$, wherein the half-life ratio $(D-2)_t/(D-1)_t$ is at least 7.

34. The method for preparing a golf ball composition of claim 19 wherein the organic peroxide (D) is a combination of two organic peroxides selected from the group consisting of dicumyl peroxide, 1,1-di(t-butylperoxy)-3,3,5-trimethylcyclohexane and 1,1-di(t-butylperoxy)cyclohexane.

35. The method for preparing a golf ball composition of claim 19, wherein the diene polymer (A) is a diene polymer of which the ends have been modified using a polyvalent modifier, either during polymerization or after polymerization.

36. The method for preparing a golf ball composition of claim 19, wherein the diene polymer (A) is a diene polymer which is synthesized by reacting a monovalent modifier and which has functional groups at the ends of the molecule or on the molecular chain.

* * * * *